United States Patent
Terai

(10) Patent No.: US 7,106,379 B2
(45) Date of Patent: Sep. 12, 2006

(54) SCAN CONVERSION APPARATUS

(75) Inventor: Haruko Terai, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 522 days.

(21) Appl. No.: 10/470,822

(22) PCT Filed: Oct. 31, 2002

(86) PCT No.: PCT/JP02/11350

§ 371 (c)(1),
(2), (4) Date: Jul. 30, 2003

(87) PCT Pub. No.: WO03/039148

PCT Pub. Date: May 8, 2003

(65) Prior Publication Data

US 2004/0061803 A1  Apr. 1, 2004

(30) Foreign Application Priority Data

Nov. 2, 2001  (JP) ............................. 2001-337655
Jul. 8, 2002  (JP) ............................. 2002-198395

(51) Int. Cl.
H04N 7/01  (2006.01)

(52) U.S. Cl. ...................... 348/441; 348/448; 348/458
(58) Field of Classification Search ................ 348/441, 348/448, 449, 458, 459; H04N 7/01, 11/20
See application file for complete search history.

(56) References Cited

U.S. PATENT DOCUMENTS

2004/0017510 A1 *  1/2004  Honda et al. ............... 348/459

FOREIGN PATENT DOCUMENTS

| JP | 5-183884 | 7/1993 |
| JP | 9-181967 | 7/1997 |
| JP | 10-108218 | 4/1998 |
| JP | 11-127423 | 5/1999 |
| JP | 2000-295581 | 10/2000 |
| JP | 2000-341648 | 12/2000 |
| JP | 2001-94950 | 4/2001 |

OTHER PUBLICATIONS

International Search Report corresponding to application No. PCT/JP02/11350 dated Feb. 18, 2003.

* cited by examiner

Primary Examiner—Sherrie Hsia
(74) Attorney, Agent, or Firm—RatnerPrestia

(57) ABSTRACT

The scan conversion apparatus of the present invention comprises a video signal discriminating circuit for discriminating the kind of input video signal based on an interlaced scanning system; a telecine scan conversion circuit for converting input video signal into a video signal based on a progressive scanning system by processing suited for telecine video signal; a scan conversion circuit for converting input video signal into a video signal based on a progressive scanning system suited for signals other than telecine video signal; and a selector which selects and delivers the output from the telecine scan conversion circuit and the output from the scan conversion circuit in accordance with the result of discrimination executed by the video signal discriminating circuit.

13 Claims, 13 Drawing Sheets

SCAN CONVERSION APPARATUS

THIS APPLICATION IS A U.S. NATIONAL PHASE APPLICATION OF PCT INTERNATIONAL APPLICATION PCT/JP02/11350.

TECHNICAL FIELD

The present invention relates to a scan conversion apparatus for video signal and a scan converting method, and particularly, to a scan conversion apparatus to be used when there exist both of telecine video signal, converted from a movie, and other video signals.

BACKGROUND ART

Recently, a television system is becoming larger in size and higher in picture quality, and a scan converter is developed for converting interlaced scan video signals of present broadcast into progressive scan video signals to be displayed.

As such a scan converting method, a prior art is described in the following. Input video signal is compared with fields or frames before and after the signal, and detected whether it is of moving picture region, still picture region, or medium region in the middle of the both regions, and classified into these three kinds of regions. In the still picture region, the input video signal and video signals before and after the signal are synthesized as odd horizontal scanning lines and even horizontal scanning lines, thereby executing line interpolation, and then converted into progressive scan video signal. In the moving picture region, the input video signal and video signals of horizontal scanning lines above and under the signal are used to obtain video signals of horizontal scanning lines to be interpolated. In the medium region, line interpolation is executed by using the fields in front and back, frames in front and back, and video signals of upper and lower horizontal scanning lines in accordance with the level of motion. The method described here is called a motion detection scan conversion. (For example, Japanese Laid-open Patent 20002-95581).

FIG. 12 shows the relations of movie, telecine video signal, and video signal after scan conversion. Generally, movie 1201 consists of 24 frames per second. In the case of a video signal system of which the number of frames per second is 30, the number of frames per second in video signal does not match the number of frames per second in movie 1201. Then, movie 1201 is converted into interlaced scanning video signal apparently same in structure as conventional video signal. In this way, movie 1201 is converted into video signal, which is called telecine video signal 1203.

Each frame 1207, 1208, 1209 of movie 1201 is, same as common video signal, converted into the field of odd horizontal scanning line (hereafter referred to as the first TV field) and the field of even horizontal scanning line (hereafter referred to as the first TV field) to become telecine video signal 1203. In this case, field 1210 formed of frame 1207 is re-inserted between the two fields formed of frame 1207 and the two fields formed of frame 1208. Also, the field formed of frame 1209 is re-inserted after the two fields formed of frame 1209. The re-inserted fields are called repeat fields. Such conversion is repeated to obtain telecine video signal 1203. Thus, 4 frames of movie 1201 become 5 frames of telecine video signal 1203.

In this way, movie 1201 of 24 frames per second turns into telecine video signal 1203 based on an interlaced scanning system of 30 frames per second. The telecine video signal 1203 includes a repeat field in which same field is repeated every 5 fields. A method of generating such telecine video signal is called 2–3 pull-down.

The pattern of 5-field period peculiar to telecine video signal 1203 is called a telecine pattern. The telecine pattern is represented every field by telecine pattern number 1202 of P1 to P5 in the order of time. Also, the telecine pattern number of the repeat field described above is defined as P1, followed by P2 to P5 in order, which is repeated in order from P1 to P5.

Next, a conventional method for converting telecine video signal 1203 into progressive scanning video signal is described as an example.

Telecine video signal 1203 is subjected to the following processing in accordance with telecine pattern number 1202 for the purpose of executing scan conversion.

One-field earlier telecine video signal 1204 corresponds to telecine video signal 1203 delayed by one field. Two-field earlier telecine video signal 1205 corresponds to telecine video signal 1203 delayed by two fields.

For P1 of telecine pattern number 1202, the field 1210 of telecine video signal 1203 and the field 1211 of one-field earlier telecine video signal 1204 are used. Since the field 1210 and field 1211 are signals formed of same frames 1207 of movie 1201, the two fields are synthesized to obtain the frame 1220 of progressive scanning video signal 1206. Similarly, for P3, field 1214 and field 1215 are used to form frame 1222, and for P5, field 1218 and field 1219 are used to form frame 1224. Also, for P2 of telecine pattern number 1202, the field 1212 of one-field earlier telecine video signal 1204 and the field 1213 of two-field earlier telecine video signal 1205 are used. Since the field 1212 and field 1213 are signals formed of same frame 1208 of movie 1201, the two fields are synthesized to obtain the frame 1221 of progressive video signal 1206. Similarly, for P4, field 1216 and field 1217 are used to form frame 1223.

In the scan conversion of the above telecine video signal, when a common video signal that moves every field is applied, there is a possibility that completely different video signals are combined to form one frame, and it may cause the picture deterioration such as appearance of double pictures.

Also, when one telecine video signal is followed by the input of another telecine video signal, the scan conversion based on the telecine pattern number of the initial telecine video signal is executed on the following another telecine video signal. As a result, picture deterioration takes place.

FIG. 13 shows how image deterioration takes place under the above mentioned circumstances.

In FIG. 13, movie 1301, telecine pattern number 1302, telecine video signal 1303, one-field earlier telecine video signal 1304, two-field earlier telecine video signal 1305, progressive scanning video signal 1306, fields 1310 to 1319, and frames 1320 to 1323 respectively correspond to the movie 1201, telecine pattern number 1202, telecine video signal 1203, one-field earlier telecine video signal 1204, two-field earlier telecine video signal 1205, progressive scanning video signal 1206, fields 1210 to 1219, and frames 1220 to 1223 in FIG. 12, and the detailed description is omitted. Telecine video signal 1303 input is converted into progressive scanning. Telecine video signal 1303 is a signal formed with the first telecine video signal 1331 and the second telecine video signal 1332 changed over at time. 1330 and joined with each other. As mentioned in the description of FIG. 12, since the conversion into progressive scanning is executed on the basis of telecine pattern number 1302, the video picture is normal up to the frame 1323 of progressive scanning video signal 1306. Since the telecine pattern number 1302 at the time 1333 is P5, frame 1324 is formed on the basis of field 1318 and field 1319. However, after the time 1330, the repeat field 1340 of second telecine video signal 1332 appears at the telecine number P4. Field 1318 is a field formed of frame 1309 of movie 1301, and field 1319 is a field formed of frame 1308 of movie 1301. Accordingly, frame 1324 formed becomes a picture synthesized with different frames of movie 1301. This may cause the deterioration of the picture.

DISCLOSURE OF THE INVENTION

The scan conversion apparatus comprises a video signal discriminating circuit for discriminating the kind of input video signal based on an interlaced scanning system, a telecine video scan conversion circuit for converting input video signal into a video signal based on a progressive scanning system by processing suited for telecine video signal, a scan conversion circuit for converting input video signal into a video signal based on a progressive scanning system by processing suited for signals other than telecine video signal, and a selector which selects and delivers the output from the telecine scan conversion circuit and the output from the scan conversion circuit according to the result of discrimination executed by the video signal discriminating circuit.

DETAILED DESCRIPTION OF THE PREFERRED EMBODIMENTS

In the conventional scan conversion described above, the first telecine video signal input is followed by the second telecine video signal input, and in case the second telecine video signal is different from the first telecine video signal with respect to telecine pattern number, the generated progressive scanning video signal is accompanied by picture deterioration.

Also, when conventional scan conversion described above is applied to common video signal that moves every field, there is a possibility that completely different images are combined with each other to form a frame of progressive scanning video signal, and it may cause picture deterioration.

Accordingly, it is necessary to execute scan conversion with great accuracy without being accompanied by picture deterioration even when telecine video signal and other common video signal are changed over or the telecine pattern of telecine video signal is changed.

The present invention provides a scan conversion apparatus which executes scan conversion with great accuracy without being accompanied by picture deterioration even when telecine video signal and other common video signal are changed over or the telecine pattern of telecine video signal is changed, (Preferred Embodiment 1)

Figure 1:
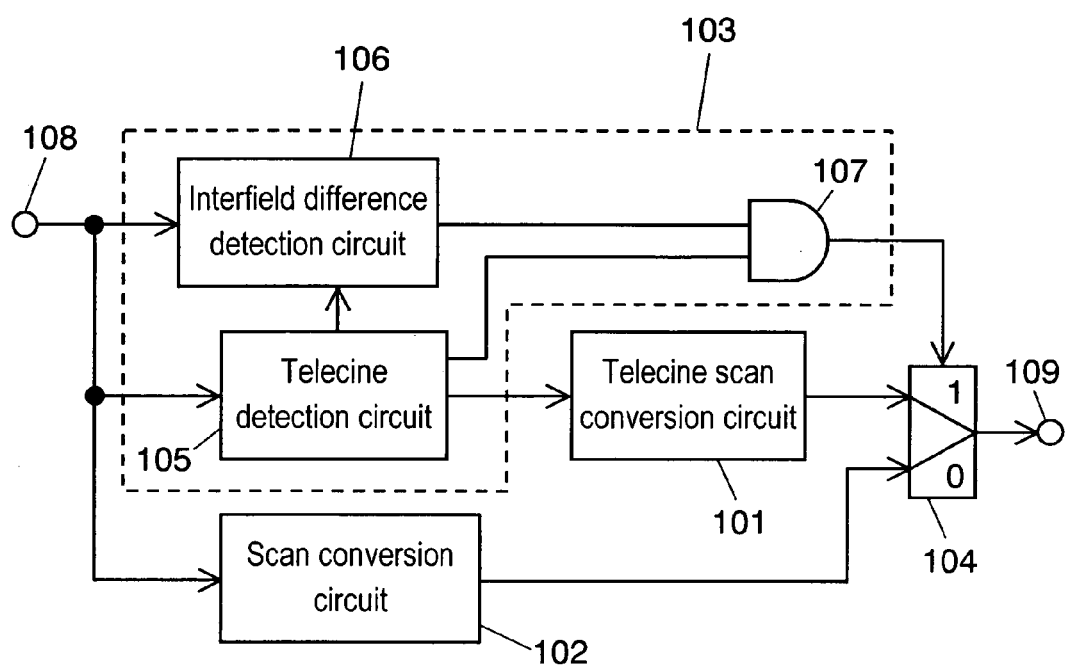
FIG. 1 is a block diagram of a scan conversion apparatus in the preferred embodiment 1 of the present invention.

FIG. 1 is a block diagram of a scan conversion apparatus in the preferred embodiment 1 of the present invention. In FIG. 1, video signal is input via video signal input terminal 108. The input video signal is a video signal based on an interlaced scanning system, which is supplied to scan conversion circuit 102, telecine detection circuit 105, and interfield difference detection circuit 106. The telecine detection circuit 105, interfield difference detection circuit 106, and first AND circuit 107 make up video signal discriminating circuit 103.

The scan conversion circuit 102 compares the input video signal with fields or frames before and after the signal in order to detect whether it is of moving picture region, still picture region, or medium region between moving picture and still picture. In the still picture region, it executes line interpolation by using the information of fields before and after the signal, and in the moving picture region, line interpolation is executed by using the information of lines above and under the signal. In the medium region between moving picture and still picture, line interpolation is executed by using the information of fields before and after, frames before and after, and scanning lines above and under. In this way, the scan conversion circuit 102 executes so-called motion detecting scan conversion.

The telecine detection circuit 105 compares the input video signal with its one-frame earlier signal in order to detect repeat field. Also, the telecine detection circuit 105 outputs the telecine pattern number of the repeat field, once input to 5 fields, as P1, and the telecine pattern numbers from P1 to P5 in order together with the relevant pictures. If repeat field once exists in 5 fields, it is judged that the input video signal is a telecine video signal, then 1 is output as discrimination signal, and if not, 0 is output.

The telecine scan conversion circuit 101 inserts the one-field earlier video signal between the scanning lines of the input video signal to generate progressive scanning video signal when the telecine pattern numbers output from the telecine detection circuit 105 are P1, P3, or P5. Also, when the telecine pattern numbers are P2 or P4, the two-field earlier video signal is inserted between the scanning lines of the one-field earlier video signal of the input video signal to generate progressive scanning video signal.

The interfield difference detection circuit 106 receives the input video signal, the discrimination signal output from the telecine detection circuit 105, and the telecine pattern number. As discrimination signal, when the input is 1, meaning a telecine video signal, the signal is processed as followed in accordance with the telecine pattern numbers. When the telecine pattern numbers are P1, P3, or P5, the interfield difference detection circuit 106 takes the field difference between the input video signal and the one-field earlier video signal. When the pattern numbers are P2 or P4, the interfield difference detection circuit 106 takes the field difference between the one-field earlier signal and the two-field earlier signal from the input signal. In case the difference is slight, the interfield difference detection circuit 106 judges that the two fields correspond to video signal formed of a frame generated from one frame of movie, and then outputs 1 as Flag. Also, if the difference is great, the interfield difference detection circuit 106 judges that the two fields do not correspond to a frame generated from one frame of movie, and then outputs 0 as Flag.

When the input video signal is a telecine video signal, the two fields compared with respect to the telecine pattern numbers P1, P3, P5 and P2, P4 must be originally a video signal generated from same frame of movie. However, the great difference means that the telecine pattern numbers output from the telecine detection circuit 105 do not match the telecine pattern numbers of the input video signal at present. Accordingly, it means that the telecine scan conversion circuit 101 executing the scan conversion under the control of the telecine pattern numbers is executing inappropriate scan conversion.

Therefore, when both of the Flag from the interfield difference detection circuit 106 and the discrimination signal of the telecine detection circuit 105 are 1, it is judged that the input video signal is a telecine video signal and that the telecine pattern numbers match the telecine patterns of the input video signal, and then the first AND circuit 107 outputs 1. Otherwise, the first AND circuit 107 outputs 0. The first selector 104 outputs the progressive scanning video signal from the telecine scan conversion circuit 101 only when 1 is output from the first AND circuit 107, and otherwise, the progressive video signal from the scan conversion circuit 102 is output.

Thus, even when the telecine pattern numbers output from the telecine detection circuit 105 are wrong, and the telecine pattern numbers do not match the telecine patterns of the video signal, the error can be detected and it is possible to select the scan conversion system with great accuracy.

(Preferred Embodiment 2)

Figure 2:
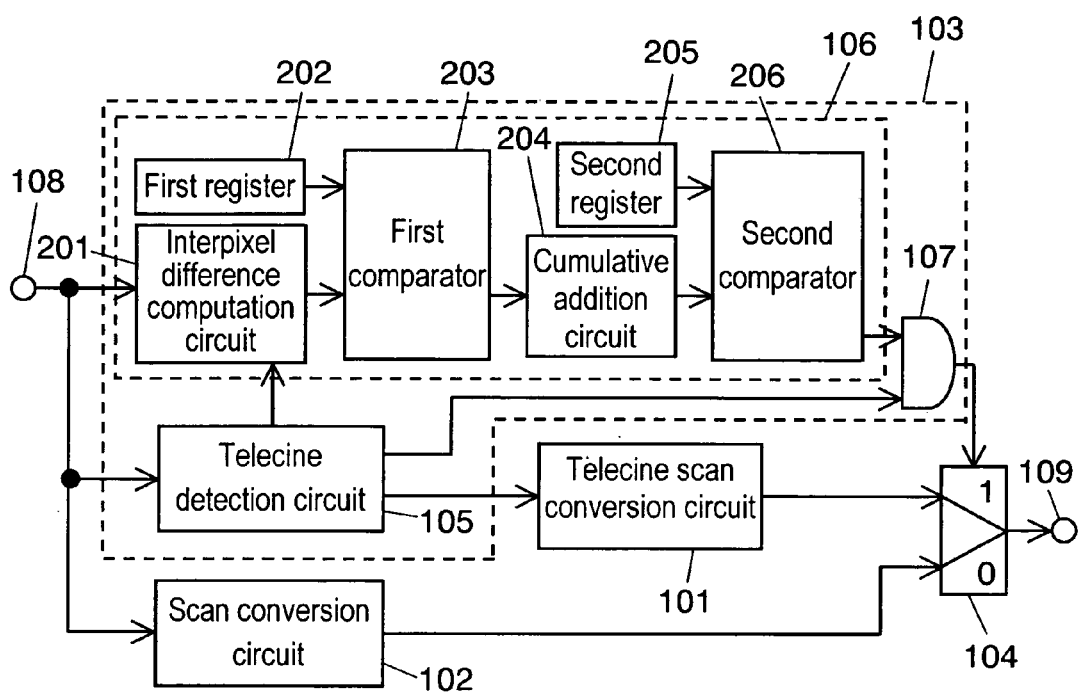
FIG. 2 is a black diagram of a scan conversion apparatus in the preferred embodiment 2 of the present invention.

FIG. 2 is a block diagram showing the detail of the interfield difference detection circuit 106 of FIG. 1 in the preferred embodiment 1 of the present invention.

As for the items described in the preferred embodiment 1 and not described in the preferred embodiment 2, the description holds true in the preferred embodiment 2 as well, and the detailed description is omitted.

In FIG. 2, the interfield difference detection circuit 106 comprises interpixel difference computation circuit 201, first register 202, first comparator 203, cumulative addition circuit 204, second register 205, and second comparator 206.

The interpixel difference computation circuit 201 takes the difference in luminance signal level between the pixels at same position in two fields of one frame probably generated from same frame of movie. Here, pixels at same position correspond to pixels at the same number of horizontal scanning lines counted from the vertical sync signal and at the same number of pixels counted from the horizontal sync signal.

The first register 202 stores the first threshold value for comparison with the differential pixel value of luminance level which is the output result of interpixel difference computation circuit 201. The first comparator 203 compares the differential pixel value of luminance level, the output result of interpixel difference computation circuit 201, with the first threshold value. When the output from the interpixel difference computation circuit 201 is greater than the first threshold value, 1 is output, and otherwise, 0 is output.

The cumulative addition circuit 204 executes cumulative addition for one field of the output from first comparator 203. The second register 205 stores the second threshold value for comparison with the output result of cumulative addition circuit 204. The second comparator 206 compares the output from cumulative addition circuit 204 with the second threshold value. When the output from cumulative addition circuit 204 is greater than the second threshold value, 0 is output, and otherwise, 1 is output.

Figure 5:
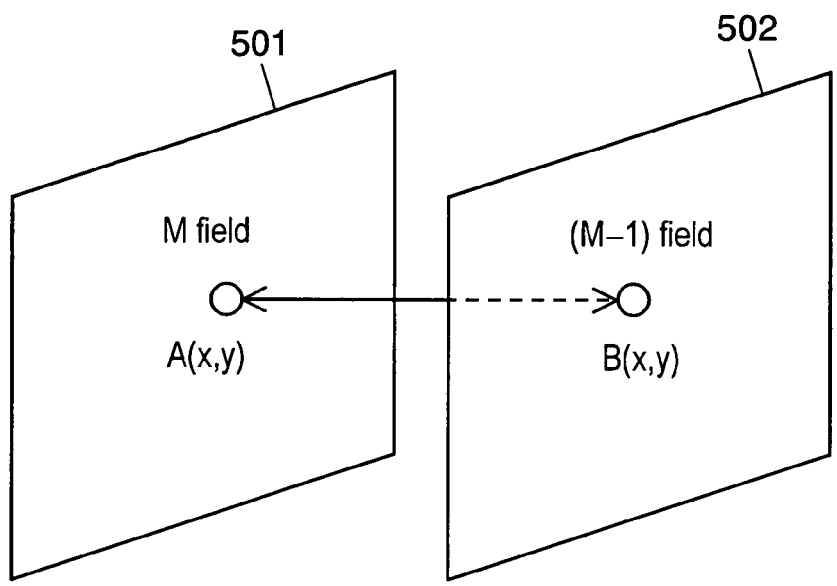
FIG. 5 is a diagram showing the positional relation between pixel and field used in an interfield difference detection circuit.
Figure 6:
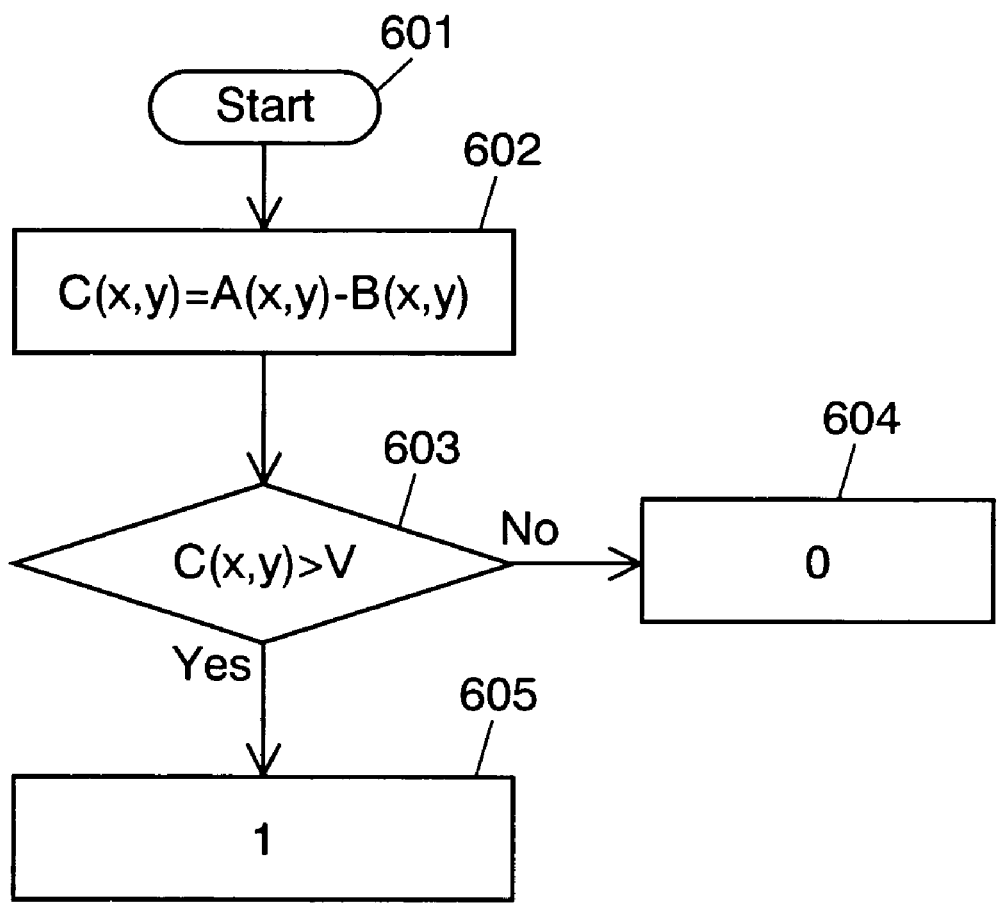
FIG. 6 is a diagram showing a part of flow of an interfield difference detection circuit.
Figure 7:
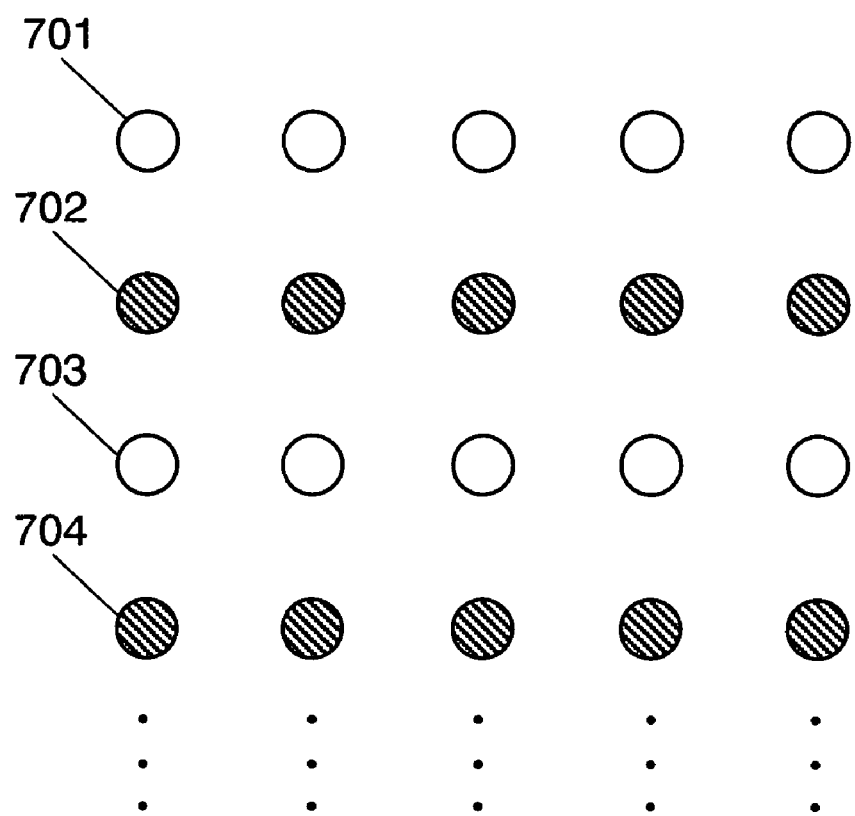
FIG. 7 is a diagram showing the relationship between pixel and field used in an interpixel difference computation circuit.

The preferred embodiment 2 is further described by using FIG. 5, FIG. 6, and FIG. 7.

Video signal and telecine pattern numbers output from the telecine detection circuit 105 are input to the interpixel difference computation circuit 201. When the telecine pattern numbers are P1, P3, or P5, the input video signal and one-field earlier video signal are used to execute the following processing, and in case of P2 or P4, the video signal one-field earlier and the video signal two-field earlier than the input video signal are used to execute the following processing.

In FIG. 5, field 501 shows the M-th field, and field 502 shows the (M−1)th field, that is, the field one-field earlier than the field 501. When the telecine pattern numbers output from the telecine detection circuit 105 are P1, P3, or P5, the field 501 is the input video signal, and the field 502 is the video signal one-field earlier than the input video signal. When the telecine pattern numbers are P2 or P4, the field 501 is the video signal one-field earlier then the input video signal, and the field 502 is the video signal two-field earlier than the input video signal. In field 501, the value of pixel A that is the x-th pixel counted from the horizontal sync signal on the y-th horizontal scanning line counted from the vertical sync signal is represented by A (x, y). In field 502, the value of pixel B that is the x-th pixel counted from the horizontal sync signal on the y-th horizontal scanning line counted from the vertical sync signal is represented by B (x, y). The interpixel difference computation circuit 201 obtains the difference in luminance level between A (x, y) and B (x, y) as the output. Incidentally, this operation is not executed during the blanking period of the picture.

FIG. 7 shows the relative positions of pixels for difference computation in the interpixel difference computation circuit 201. As described above, when the telecine pattern numbers of the telecine video signal are P1, P3, or P5, the field (field 501) of the video signal to be input and one-field earlier video signal (field 502) are used, and in case of P2 or P4, the signal (field 501) one-field earlier and the video signal (field 502) two-field earlier against the input video signal are used. In FIG. 7, the field 501 is the first TV field, and the field 502 is the second TV field. Pixel 701 and pixel 703 are pixels on the horizontal scanning line of field 501, and pixel 702 and pixel 704 are pixels on the horizontal scanning line of field 502. Both fields shown here correspond to the same frames generated by same frames of movie. Each pixel shown by a circle corresponds to A (x, y) in FIG. 5, and each pixel shown by a shaded circle corresponds to B (x, y) in FIG. 5.

FIG. 6 is a flow chart showing the operation of the interpixel difference computation circuit 201, the first register 202, and the first comparator 203 in FIG. 2. In step 601 (Start), the process is started, and in step 602, the computation is executed by using A (x, y) and B (x, y). C (x, y) is the value obtained by subtracting B (x, y) from A (x, y). C (x, y) is the computation result output from the interpixel difference computation circuit 201. Next, in step 603, the difference between C (x, y) and the first threshold value V stored in the first register 202 is judged. C (x, y) is compared with the first threshold value V. When C (x, y) is equal or greater than the first threshold value V, it goes to the step 605, and 1 is output in a sense that the video contents are different between both fields. And, when C (x, y) is less than the first threshold value V, it goes to the step 604, and 0 is output in a sense that there is no difference between both fields with respect to the video contents.

The cumulative addition circuit 204 executes cumulative addition of the output results from the first comparator 203 within the effective period of the picture, that is, other than the blanking period, and outputs the result of addition. The second register 205 stores the second threshold value compared with the output result of cumulative addition circuit 204. The second comparator 206 outputs 0 when the output result of cumulative addition circuit 204 is equal or greater than the second threshold value, and outputs 1 when the output result of cumulative addition circuit 204 is less than the second threshold value. It becomes Flag that is the output from interfield difference detection circuit 106. In this way, the difference between fields is detected every pixel, and thereby, the interfield difference detection circuit 106 executes accurate detection even against very high definition video signals. Also, even in case of video signal with unspecific elements such as noise added thereto, the detection results hardly influenced by such unspecific elements can be obtained by comparing the output result of interpixel difference computation circuit 201 with the first threshold value to output the result of checking for difference between the pixels.

In the above description, the cumulative addition circuit 204 executes the addition with respect to all pixels except during the blanking period.

However, artificial pictures are sometimes superposed on the video signal. For example, superimposed dialogue or time is sometimes superposed. When such signal is superposed, the portion of the picture is different in property from other portions. If the video discrimination circuit 103 executes the video discrimination including the superposed portion, there is a possibility that faulty operation takes place in video discrimination. In order to avoid such problem, the present invention can be configured in that the cumulative addition circuit 204 does not operate on the whole picture but on a limited region except the extremity portions and the like of the picture. In this way, it is possible to realize more reliable video signal discrimination and to obtain a scan conversion apparatus capable of further reducing the possibility of picture deterioration.

(Preferred Embodiment 3)

Figure 3:
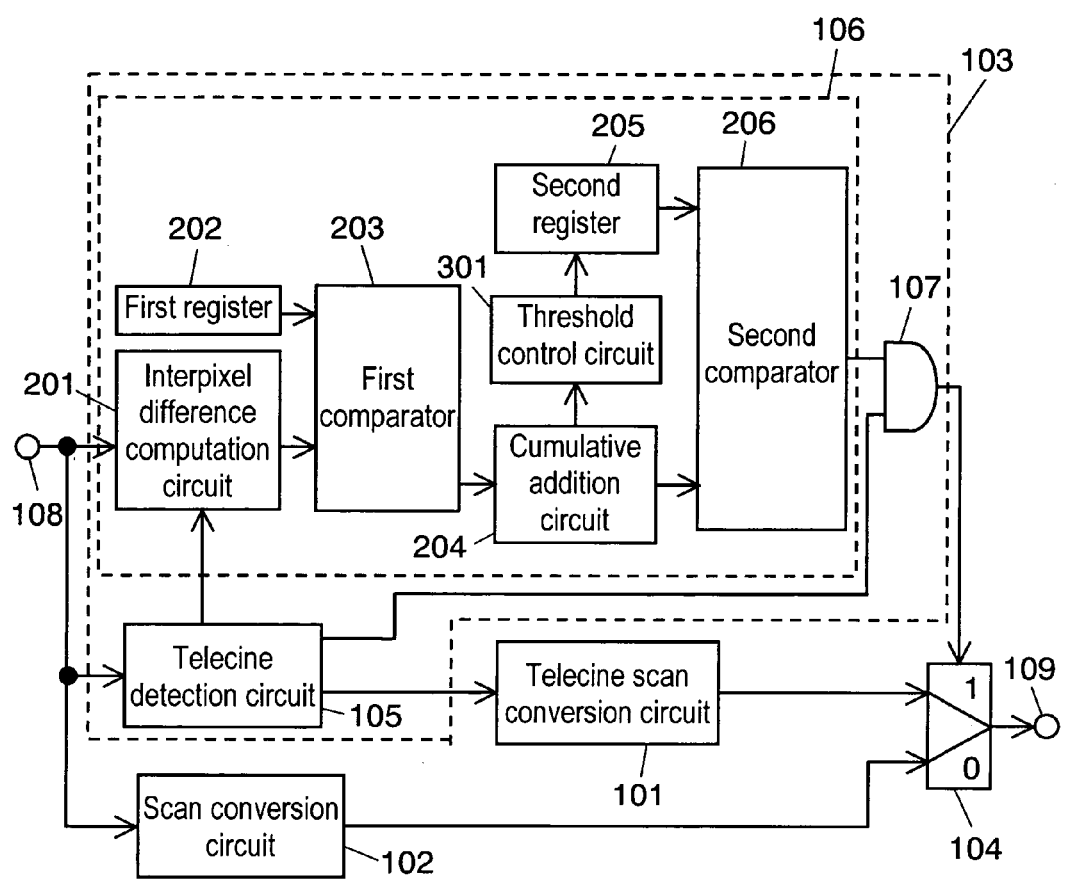
FIG. 3 is a block diagram of a scan conversion apparatus in the preferred embodiment 3 of the present invention.

Next, FIG. 3 is a block diagram showing a video conversion apparatus in the preferred embodiment 3 of the present invention. In the figure, those other than the threshold control circuit 301 are same as in FIG. 2.

The second threshold value stored in the second register 205 in FIG. 2 is a fixed value. However, in FIG. 3, the second threshold value stored in the second register 205 is controlled by the threshold control circuit 301.

Video signal including much region of flat pictures such as animation is mentioned as an example. In video signal including much region of flat pictures, there exists much region where the differential pixel value calculated by the interpixel difference computation circuit 201 is relatively small. Consequently, for the differential sum for one field obtained by the cumulative addition circuit 204, the sum is relatively small, and it is sometimes unable to detect even when there exist editing points of telecine video signal and the like.

In order to prevent such faulty operation, the threshold control circuit 301 observes the differential sum output from the cumulative addition circuit 204. For example, the threshold control circuit 301 calculates the average of differential sum for 4 fields, excluding the largest value from among the five fields, out of the differential sum output from the cumulative addition circuit 204. The second threshold value stored in the second register 205 is increased or decreased in accordance with the average value. For example, when the average value is relatively small, the second threshold value is decreased, and the second threshold value is supplied to the comparator 206.

The largest value of the differential sum is excluded from among the five fields as described above because there is a high possibility that the largest field of the differential sum is the editing point of the telecine video signal.

By using such a configuration, it is possible to precisely detect the editing point even in case of telecine video signal whose difference output from the interpixel difference computation circuit 201 is relatively small. As a result, a scan conversion apparatus capable of suppressing the generation of picture deterioration can be realized.

(Preferred Embodiment 4)

Figure 4:
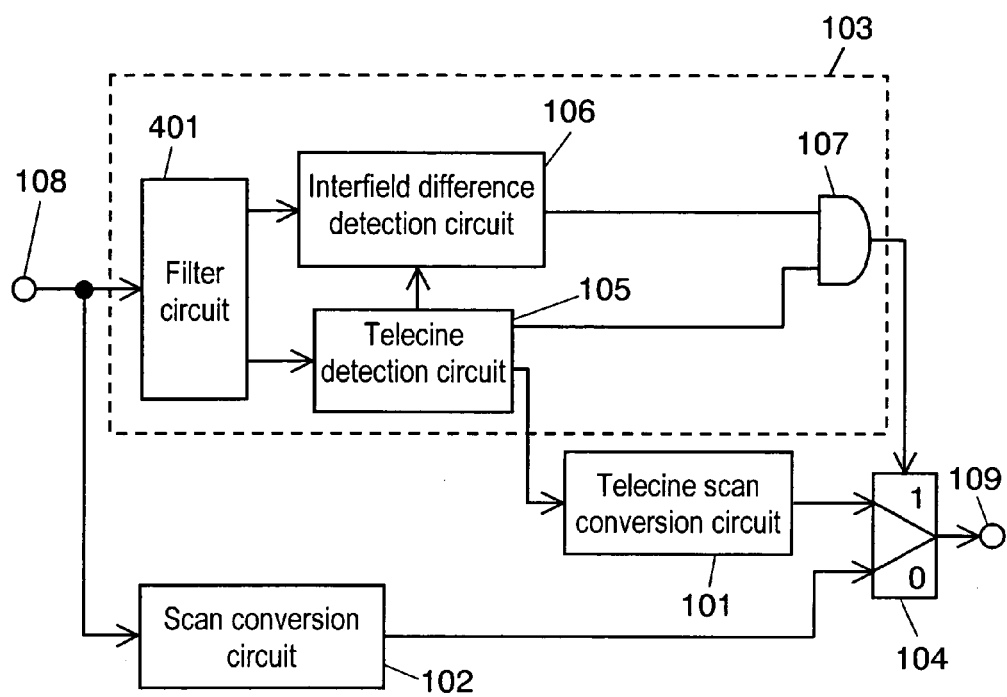
FIG. 4 is a black diagram of a scan conversion apparatus in the preferred embodiment 4 of the present invention.

Next, FIG. 4 is a block diagram showing a scan conversion apparatus in the preferred embodiment 4. In the figure, those other than filter circuit 401 are same as in FIG. 2. Accordingly, the detailed description of those other than the filter circuit 401 is omitted.

In FIG. 4, the video signal applied to the video signal input terminal 108 is supplied to the filter 401 and the scan conversion circuit 102. The filter 401 serves to filter the input video signal with respect to specific characteristics. The filter 401 is used for avoiding faulty operation due to undesirable component such as noise included in the input video signal and for avoiding faulty operation due to carrier chrominance signal component. The filter 401 used for eliminating undesirable component such as noise included in the input signal is, for example, a low-pass filter. The filter 401 used for eliminating carrier chrominance signal component is, for example, a band-suppression filter.

Thus, it is possible to reduce faulty operation in the telecine detection circuit 105 and the interfield difference detection circuit 106. Consequently, the quality and reliability of scan conversion apparatus is improved.

(Preferred Embodiment 5)

The preferred embodiment 5 of the present invention will be described by using FIGS. 7, 8, 9. Incidentally, as for the items described in each of the above preferred embodiments and not described in the preferred embodiment 5, the description falls true in the preferred embodiment 5 as well, and the detailed description is omitted.

The preferred embodiment 5 refers to a method of computing interpixel difference, wherein the computation of interpixel difference is executed according to the operation different from that of the interpixel difference computation circuit 201 in the preferred embodiment 2.

In FIG. 7, A (x, y) and B (x, y) are same in the number of horizontal scanning lines from the vertical sync signal respectively, and also same in the number of pixels from the horizontal sync signal. However, even in case of being formed of same frame of movie, these pixels are not in completely same position, but there is a difference equivalent to the horizontal scanning line interval on the progressive scanning video signal.

Figure 8:
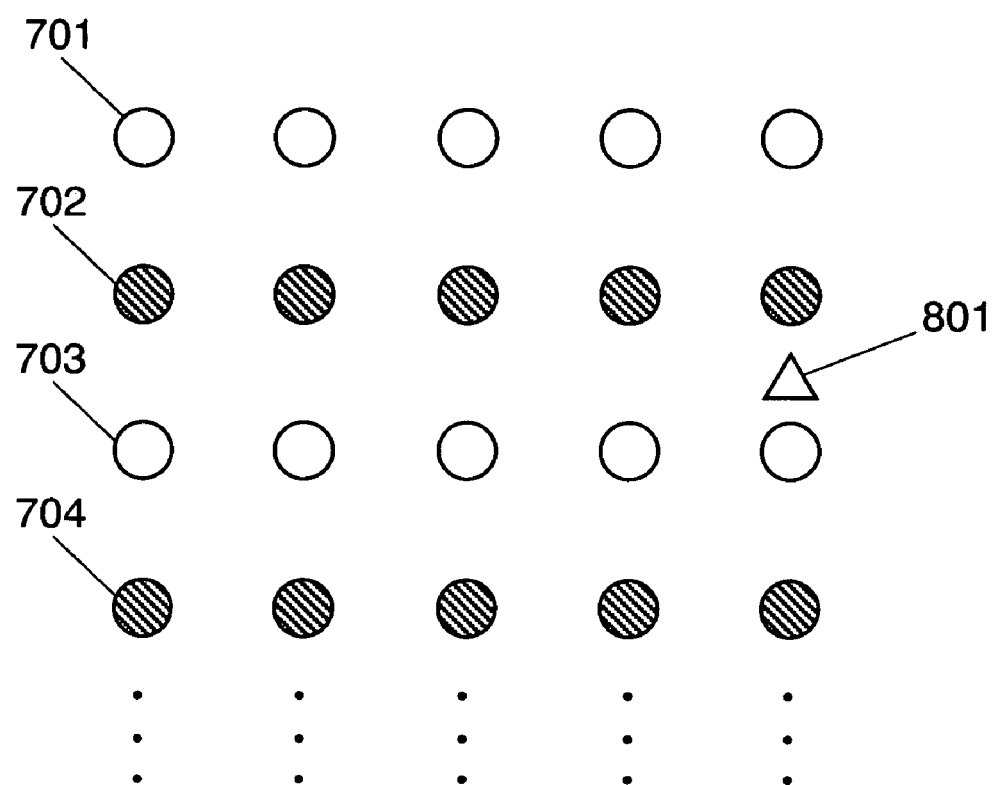
FIG. 8 is a diagram showing the relationship between pixel and field used in an interpixel difference computation circuit in the preferred embodiment 5.
Figure 9:
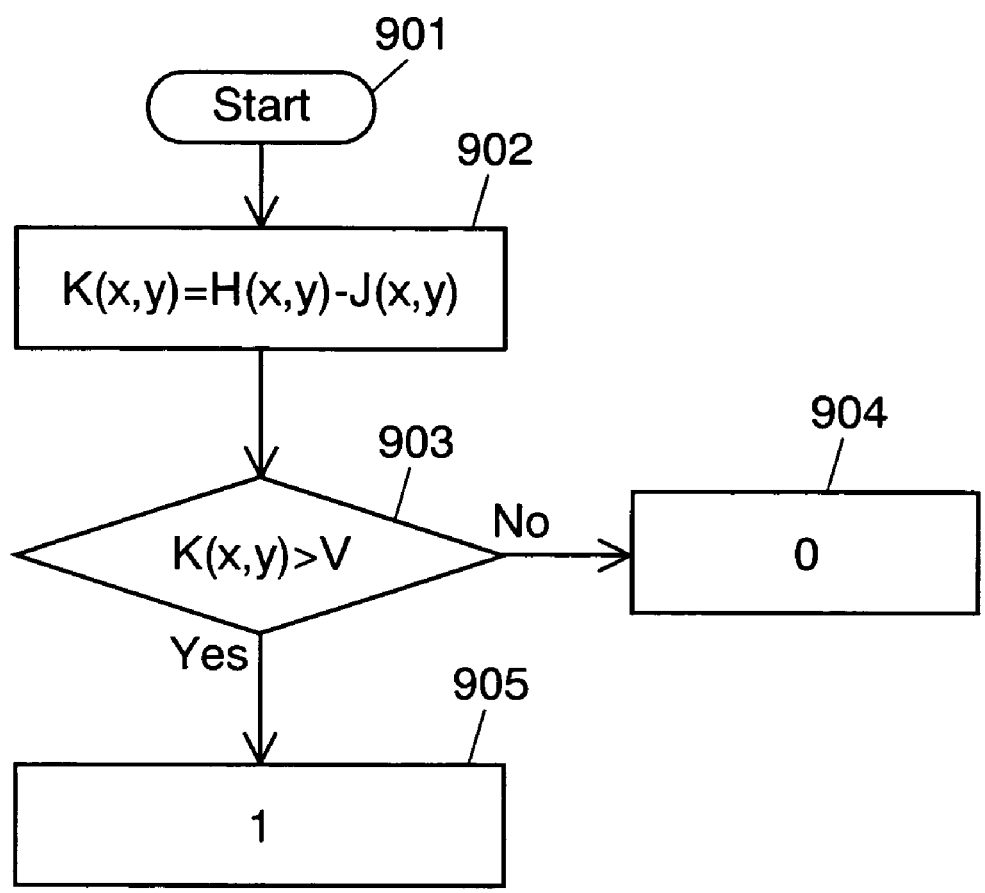
FIG. 9 is a diagram showing a part of flow in the preferred embodiment 5.

Therefore, in the preferred embodiment 5, pixels used for taking the difference are generated by the method shown in FIG. 8. In FIG. 8, same as in FIG. 7, field 501 is the first TV field, and field 502 is the second TV field. Also, pixel 701 and pixel 703 are pixels on the horizontal scanning line of field 501, and pixel 702 and pixel 704 are pixels on the horizontal scanning line of field 502.

First, luminance level H (x, y) having a component, H (x, y)=(A (x, y−1)+3×A(x, y))/4, is generated from the luminance level of A (x, y−1) and A (x, y). Also, luminance level J (x, y) having a component, J (x, y)=(3×B (x, y−1)+B (x, y))/4, is generated from the luminance level of B (x, y−1) and B (x, y).

Next, in the flow chart of FIG. 9, the operation of interpixel difference computation circuit 201, first register 202, and first comparator 203 will be described in the following.

In step 901 (Start), the process is started. Subsequently, in step 902, K (x, y) is calculated. The difference between H (x, y) having the luminance level of A (x, y−1) and A (x, y) described in FIG. 8 by a ratio of 1 to 3 and J (x, y) having the luminance level of B (x, y−1) and B (x, y) by a ratio of 3 to 1 is K (x, y). Next, it goes to the step 903. When K (x, y) is equal or greater than the first threshold value V stored in the first register 202, it goes to the step 905, and then 1 is output, and when K (x, y) is less than the first threshold value V, it goes to the step 904, and then, 0 is output.

The above process corresponds to such operation that the luminance level component of pixel to be compared is calculated by a ratio in accordance with the position of the pixel to generate H (x, y) and J (x, y), thereby generating the luminance level of pixels of same position. That is, the pixels shown by circles and the pixels shown by shaded circles in FIG. 8 are converted into pixels of same vertical position. Pixel 801 shown by an triangle is one of the examples. Accordingly, the output result from the interpixel difference computation circuit 201 does not include the component of luminance level difference due to the difference in pixel position, and thereby, highly accurate computation result can be obtained.

As described above, according to the scan conversion apparatus of the present invention, even when the input video signal includes both of telecine video signal and other video signals, or even in case the input video signal has a new telecine pattern as the telecine pattern is interrupted amidst the telecine video signal, it is possible to accurately detect whether it is a picture whose one frame is formed of same frame of movie by comparing the two fields combined. On the basis of the detection result, the scan conversion method for telecine video signal and the scan conversion method for other video signals can be accurately changed over.

Also, in the present invention, it is possible to detect the border timing between telecine video signal and other video signal, or the border timing between telecine video signal and another telecine video signal in which repeat field exists in timing different from the telecine video signal. As a result, even when there exist both of telecine video signal and other video signals, the telecine video signal can be accurately detected, and it is possible to realize progressive scan conversion without picture deterioration due to wrong selection the scanning line interpolation method.

Also, in the present invention, in the comparison of fields of frame generated from same frame of movie, pixels in specified pixel positions are sequentially compared with each other, and the boundary timing between telecine video signal and other video signal or between the telecine video signal and telecine video signal where the repeat field exists in different timing from that of the telecine video signal can be detected according to the result of cumulative addition in one field of comparison result. Highly accurate field comparison can be executed by making the comparison every pixel also with respect to very fine video signals. Since the telecine pattern detection of telecine video signal can be accurately executed, it is possible to execute progressive scan conversion without picture deterioration due to wrong selection of the horizontal scanning line interpolation method.

Also, in the present invention, in the comparison of fields of frame generated from same frame of movie, video signals corresponding to same position with respect to each field are generated from pixels used for comparison and pixels therearound so that the pixels used for comparison are not deflected from each other by ½ of the horizontal scanning line interval. The result of comparison of the pixels thus produced is accumulated in the field, and the telecine video signal and other video signals are precisely detected according to the result of the accumulation. Also, the telecine video signal and telecine video signal in which the repeat field exists in timing different from the telecine video signal are precisely detected. As a result, the pattern detection of telecine video signal can be accurately performed, and it is possible to realize progressive scan conversion without picture deterioration due to wrong selection of the scanning line interpolation method.

(Preferred Embodiment 6)

Figure 10A:
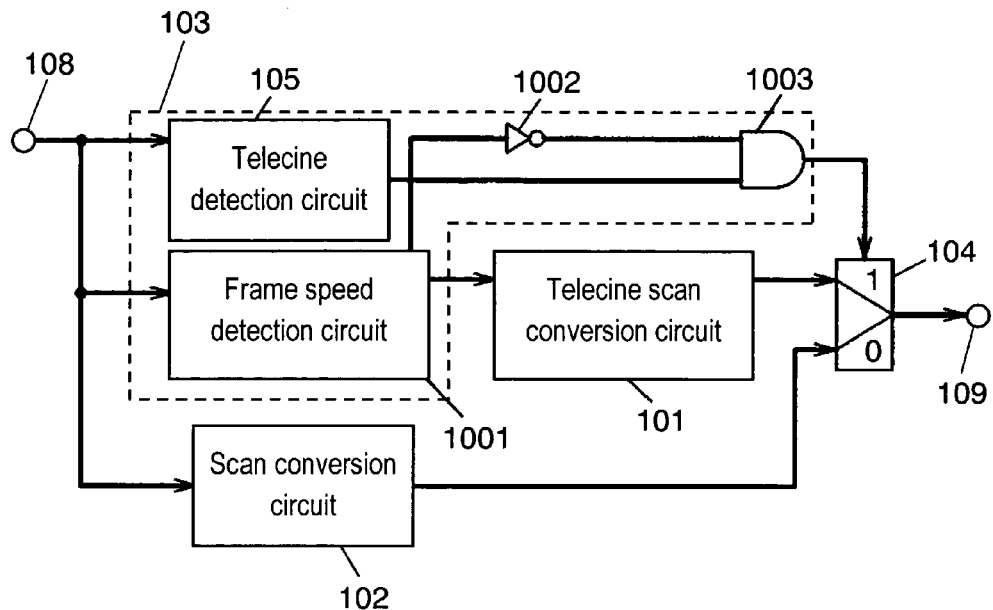
FIG. 10A is a block diagram of a scan conversion apparatus in the preferred embodiment 6.

FIG. 10A shows a block diagram of a scan conversion apparatus in the preferred embodiment 6 of the present invention. Also, FIG. 11 is a diagram showing in detail a part of FIG. 10A.

In FIG. 10A, video signal input terminal 108, scan conversion circuit 102, video signal discriminating circuit 103, telecine scan conversion circuit 101, first selector 104, telecine detection circuit 105, and video signal output terminal 109 are same as those in FIG. 1, and the detailed description is omitted.

Video signal is input to the telecine detection circuit 105, and when the video signal is a telecine video signal, the telecine detection circuit 105 outputs 1 as the discrimination signal, and if not, it outputs 0 as the discrimination signal. The scan conversion circuit 102 is a scan conversion circuit for converting video signal other than telecine video signal into progressive scanning. The frame speed detection circuit 1001 detects the frame speed of the input video signal every pixel. The telecine scan conversion circuit 101 executes progressive scan conversion suited for telecine video signal. NOT circuit 1002 executes logical NOT of the output from the frame speed detection circuit 1001 and supplies it to the second AND circuit 1003. The second AND circuit 1003 obtains the logical product of the discrimination signal from the telecine detection circuit 105 and the output from NOT circuit 1002. The video signal discriminating circuit 103 comprises the frame speed detection circuit 1001, telecine detection circuit 105, NOT circuit 1002, and second AND circuit 1003. The first selector 104 is controlled by the output from the second AND circuit 1003. The first selector 104 selects the output from telecine scan conversion circuit 101 when the output from the second AND circuit 1003 is 1, and the output from scan conversion circuit 102 when the output from the second AND circuit 1003 is 0.

Figure 11:
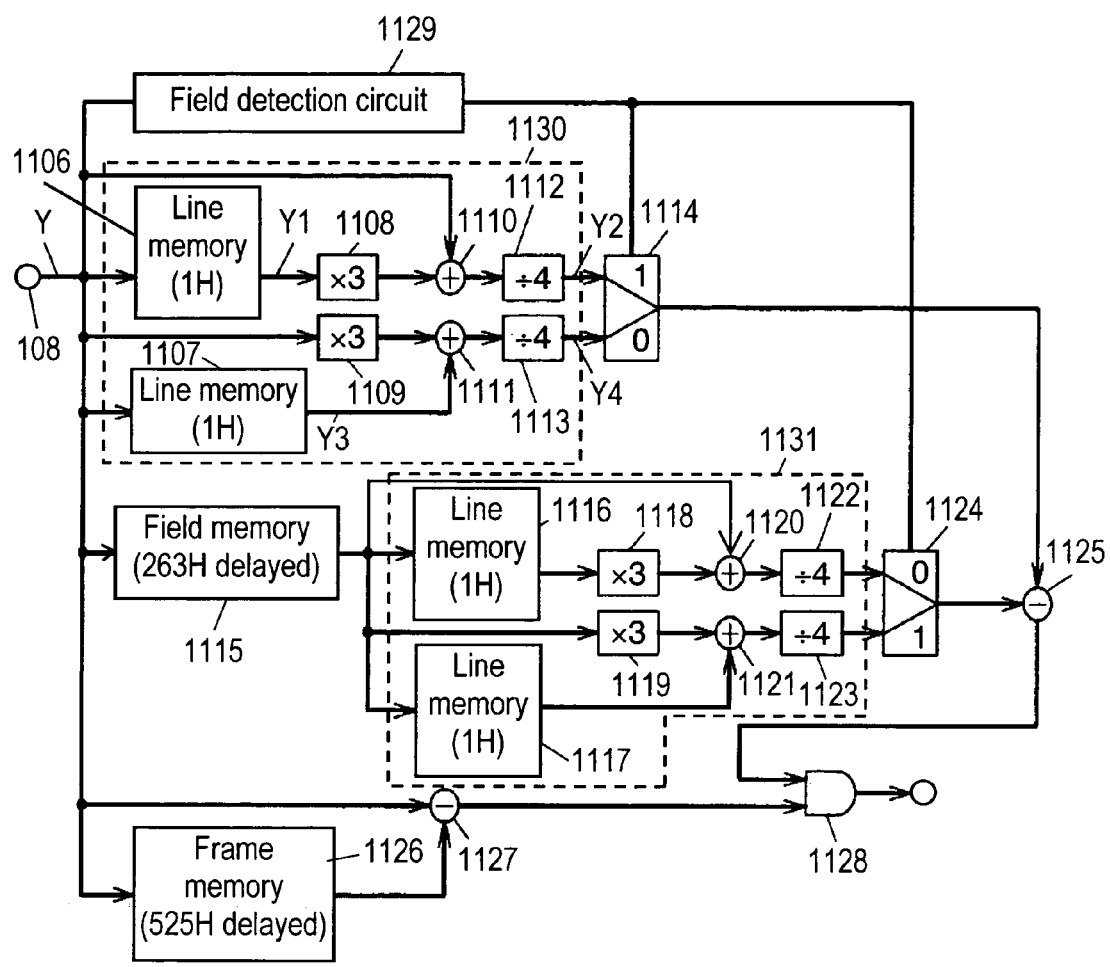
FIG. 11 is a block diagram showing the configuration of a frame speed detection circuit in FIG. 10A.
Figure 12:
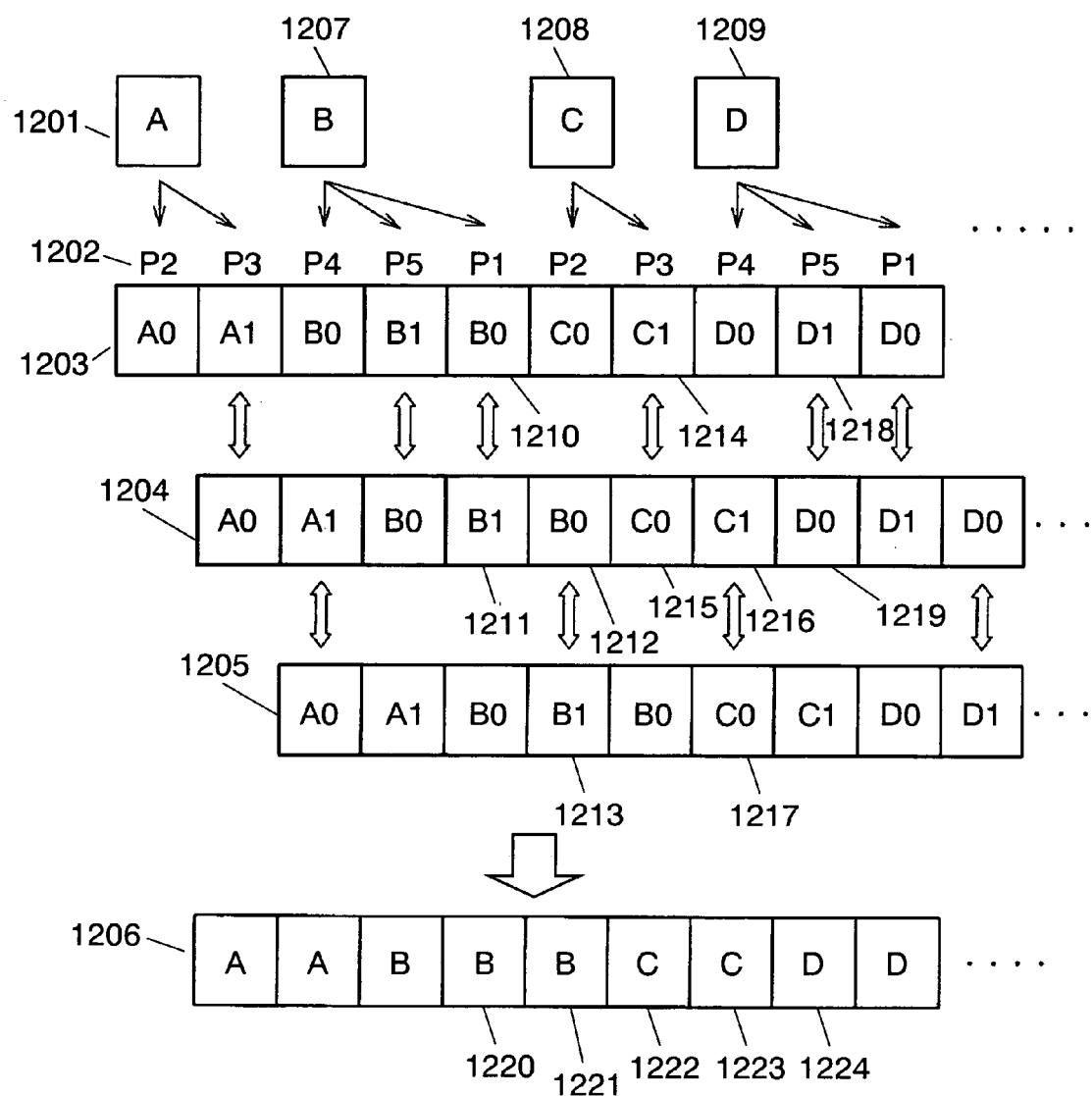
FIG. 12 is a diagram showing the relations between movie and telecine video signal, and between telecine video signal and progressive scanning video signal.
Figure 13:
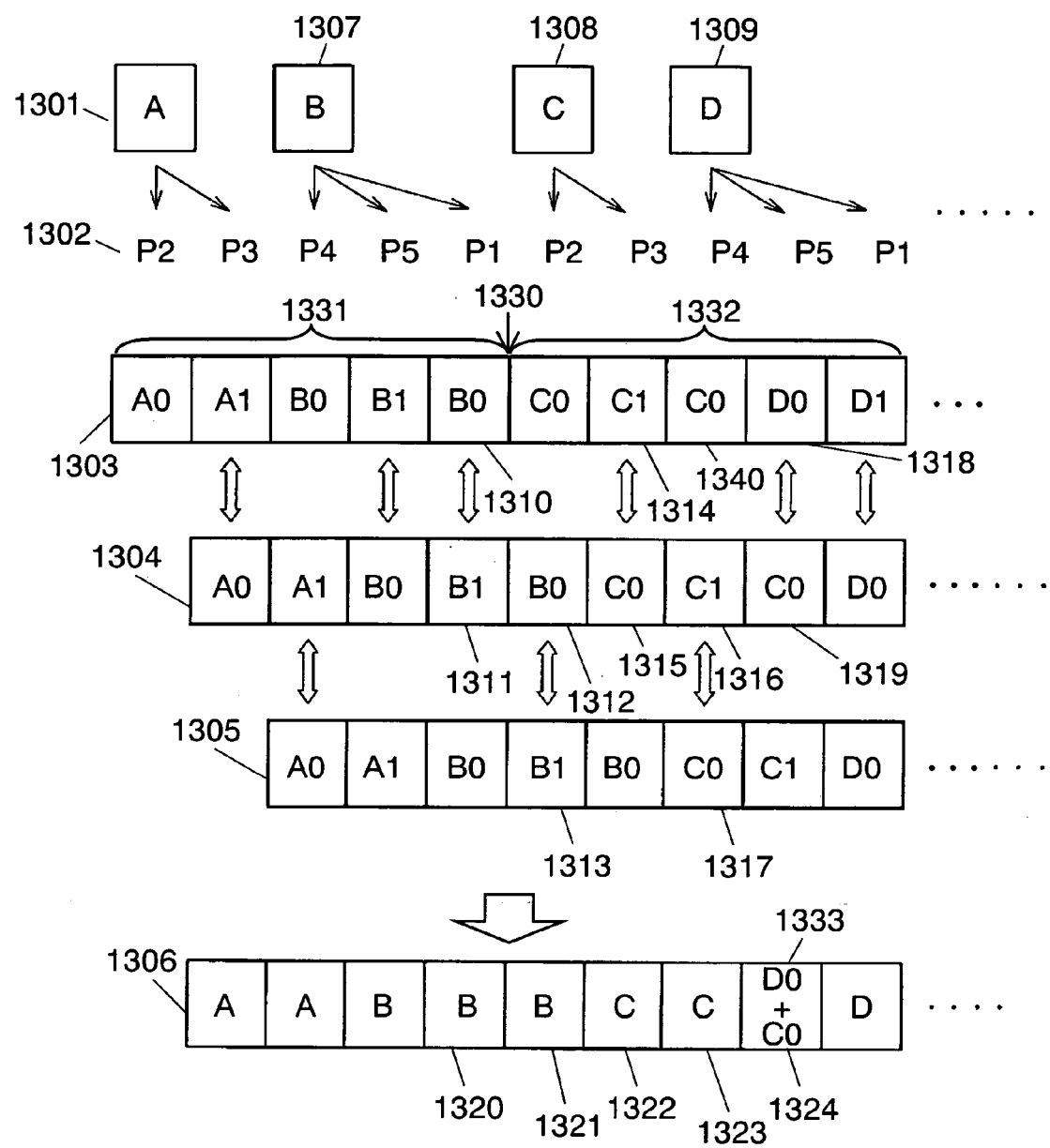
FIG. 13 is a diagram showing how image deterioration takes place when telecine video signal is converted into progressive scanning video signal by a conventional system.

FIG. 11 shows the configuration of frame speed detection circuit 1001 of FIG. 10A. In FIG. 11, line memory 1106 stores the input video signal for one horizontal scanning period, and delivers the output, in the order of input, in timing delayed by constant time from the input of the next horizontal sync signal. The delay by constant time is adjusted so that the input timing of effective pixels of the next horizontal scanning line is simultaneous with the output timing of effective pixels from the line memory 1106.

Next, multiplier 1108 converts the output video signal from the line memory 1106 into a triplex value. Adder 1110 adds the output video signal and input video signal from the multiplier 1108. Divider 1112 converts the output video signal from the adder 1110 into a quarter value.

Accordingly, when the pixel value of video signal input through the video signal input terminal 108 is Y, and the pixel value of video signal output from the line memory 1106 is Y1, then the output video signal Y2 from the divider 1112 can be represented by formula 1.

$$Y2=(Y+3\times Y1)/4 \quad\text{(Formula 1)}$$

Also, the line memory 1107 stores the input video signal for one horizontal scanning period, and delivers the output, in the order of input, after lapse of constant time from the next horizontal sync signal input. The delay by constant time is adjusted the same as in the operation of line memory 1106 so that the input timing of effective pixels of the next horizontal scanning line is simultaneous with the effective pixel output from the line memory 1107.

Multiplier 1109 converts the input video signal into a triplex level, and adder 1111 adds the output from the line memory 1107 and the output from the multiplier 1109. Divider 1113 converts the output from the adder 1111 into a quarter level.

Accordingly, when the pixel value of video signal input through the video signal input terminal 108 is Y, and the pixel value of video signal output from the line memory 1107 is Y3, then the output video signal Y4 from the divider 1113 can be represented by formula 2.

$$Y4=(3\times Y+Y3)/4 \quad\text{(Formula 2)}$$

The outputs from divider 1112 and divider 1113 are input to the second selector 1114.

The line memory 1106, line memory 1107, multiplier 1108, multiplier 1109, adder 1110, adder 1111, divider 1112, and divider 1113 make up the first weighted sum circuit group 1130.

Field detection circuit 1129 outputs 0 when the video signal input through the video signal input terminal 108 is a signal of first TV field, and outputs 1 when it is second TV field. The output from the field detection circuit 1129 is input as a selection control signal to the second selector 1114 and the third selector 1124. The second selector 1114 supplies the output video signal from the divider 1113, when the input from the field detection circuit 1129 is 0, and the output from the divider 1112, when the input from the field detection circuit 1129 is 1, respectively to the first subtraction circuit 1125.

Similar processing is also executed on the video signal 1-field delayed by the field memory 1115.

The line memory 1116 and line memory 1106, the line memory 1117 and line memory 1107, the multiplier 1118 and multiplier 1108, the multiplier 1119 and multiplier 1109, the adder 1120 and adder 1110, the adder 1121 and adder 1111, the divider 1122 and divider 1112, the divider 1123 and divider 1113, and the selector 1124 and selector 1114 are respectively identical in operation with each other. Also, the line memory 1116, line memory 1117, multiplier 1118, multiplier 1119, adder 1120, adder 1121, divider 1122, and divider 1123 make up the second weighted sum circuit group 1130. The third selector 1124 selects the output from divider 1123 when the output from field detection circuit 1129 is 1, and the third selector 1124 selects the output from divider 1122 when the output from field detection circuit 1129 is 0.

The output signals from the second selector 1114 and the third selector 1124 are input to the first subtracter 1125, and the first subtracter 1125 calculates the differential between the two for each pixel.

As for the pixel selected by the second selector 1114 and the third selector 1124 according to the selection control signal from the field detection circuit 1129, the phase deflection of horizontal scanning line of each field that exists because of interlaced scanning video signal is eliminated in the operation of formula 1 and formula 2. As for pixels of which the difference as the operational result of first difference calculator 1125 are relatively great, it can be judged that they are not the pixels in a frame formed of same frame of movie.

Here, there is a possibility that noise or video signal varying every line is sometimes input to the video signal, and it may be output as a differential signal. Also, the substantial frame speed of telecine video signal is 24 per second, while the frame speed of common video signal is 30 per second. However, even in case of video signal whose frame speed is different from that of telecine video signal, there arises no problem such as double line display if it is a still picture.

Accordingly, even in case of pixels of different frame speed, it is preferable to use the conversion output at the scan conversion circuit 102 only against the portion judged to be a moving picture through moving picture detection. And, the frame memory 1126 stores one frame of video signal input through the video signal input terminal 108. The second subtracter 1127 calculates the difference between the video signal input via the video signal input terminal 108 and the video signal output from the frame memory 1126. When the difference is great, the pixel is judged to be a moving picture pixel.

The third AND circuit 1128 outputs 1 when the pixel is of different frame speed and is a moving picture pixel, and in other cases, outputs 0 as the signal from the frame speed detection circuit 1001.

The NOT circuit 1002 reverses the output from the frame speed detection circuit 1001 and supplies it to the second AND circuit 1003. The second AND circuit 1003 takes the logical product of the output from the telecine detection circuit 105 and NOT circuit 1002. The first selector 104 operates in accordance with the output from the second AND circuit 1003. The first selector 104 supplies the output from the telecine scan conversion circuit 101 when the output from the second AND circuit 1003 is 1, and the output from the scan conversion circuit 102 when the output from the second AND circuit 1003 is 0, respectively to the video signal output terminal 109.

By using the preferred embodiment 6 described above, even in case of video signal input of which video signal different in frame speed is multiplexed on telecine-converted video signal, it is possible to prevent picture deterioration such as double picture by selecting a scan conversion method suited for each video signal.

Incidentally, the coefficients of the multipliers and the dividers in the preferred embodiment 6 are set so as to minimize the memories required.

Also, FIG. 11 shows a configuration using line memories 1106, 1107, 1116, and 1117, but it is also possible to adopt a configuration using the line memories 1106 and 1107 or line memories 1116 and 1117 in compatible fashion.

Also, FIG. 11 shows a configuration wherein the first subtraction circuit 1125 is directly connected to the third AND circuit 1128, and also the second subtraction circuit 1127 is directly connected to the third AND circuit 1128. It is also possible to insert a circuit which outputs 0 or 1 on the basis of the output value of the first subtraction circuit 1125 between the first subtraction circuit 1125 and the third AND circuit 1128. It is also possible to insert a circuit which outputs 0 or 1 on the basis of the output value of the second subtraction circuit 1127 between the second subtraction circuit 1127 and the third AND circuit 1128.

Also, it is possible to omit the NOT circuit 1002 of FIG. 10A, changing the third AND circuit 1128 to NAND circuit.

(Preferred Embodiment 7)

The preferred embodiment 7 of the present invention will be described in the following.

In the preferred embodiment 7, the scan conversion circuit 102 in FIG. 10A executes adaptive scan conversion.

Figure 10B:
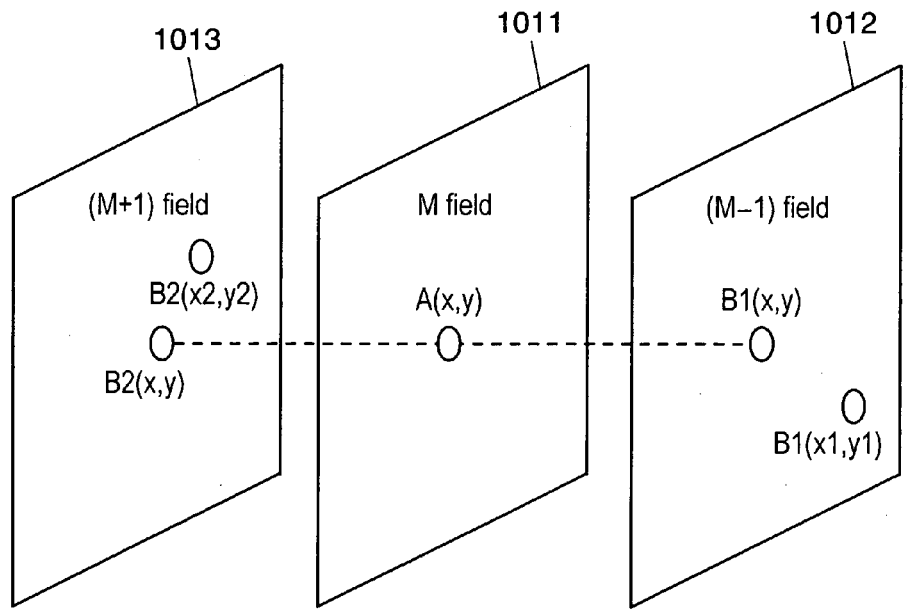
FIG. 10B is a diagram showing the relationship between pixel and field used in a scan conversion circuit in the preferred embodiment 6.

FIG. 10B is a diagram for describing the adaptive scan conversion, showing continuous three fields. In FIG. 10B, field 1011 is a field (M field) input at present, field 1012 is a field ((M−1) field) one-field earlier than the field 1011, and field 1013 is a field ((M+1) field) one-field later than the field 1011. The value of pixel A, x-th one from the horizontal sync signal, on the y-th horizontal scanning line in the field 1011 is A (x, y), the value of pixel B1, x-th one from the horizontal sync signal, on the y-th horizontal scanning line in the field 1012 is B1 (x, y), the value of pixel B1, x-1st one from the horizontal sync signal, on the y-1st horizontal scanning line in the field 1012 is B1 (x1, y1), the value of pixel B2, x-th one from the horizontal sync signal, on the y-th horizontal scanning line in the field 1013 is B2 (x, y), and the value of pixel B2, x-2nd one from the horizontal sync signal, on the y-2nd horizontal scanning line in the field 1013 is B2 (x2, y2).

The adaptive scan conversion circuit 102 judges which pixels must be used along with the pixel A (x, y) of field 1011 input at present for generating progressive scan video signal. When the difference between pixel A (x, y) and B1 (x, y) is increased due to motion or the like, as to B1 (x, y) in the field 1012 and pixel in the field 1013, that is different in position from pixel B2 (x, y), pixel being highly coincidental with pixel A (x, y) is searched for. As a result, pixel B1 (x1, y1) existing in the field 1012 and B2 (x2, y2) existing in the field 1013 are found out. Then, it is converted into progressive scan video signal by using pixel A (x, y) and pixel B1 (x1, y1) or pixel B2 (x2, y2).

Thus, the adaptive scan converter 102 executes the conversion into progressive scan video signal against video signal pixels different in frame speed detected by the frame speed detector 1001 by using highly correlated pixels out of the video signal fields input earlier and later in time. In this way, even when the frame speed is different, scan conversion is executed between highly correlated video signals, thereby realizing ideal scan conversion.

As described above, according to the scan conversion apparatus of the present invention, even when there exist both of telecine video signal and video signal having a frame speed different from that of the telecine video signal, the method of scan conversion into progressive scanning can be changed over by detecting the frame speed every pixel. As a result, it is possible to execute ideal progressive scan conversion against telecine video signal, and scan conversion suited for the video signal against video signal having a frame speed other than that of the telecine video signal.

Also, as to video signal pixels of different frame speed, progressive scan conversion of high picture quality can be executed by using highly correlated video signals out of the fields earlier and later in time.

Also, even in case of wrong detection of frame speed, it is possible to perform progressive scan conversion hardly accompanied by picture deterioration.

INDUSTRIAL APPLICABILITY

The video signal detector of the present invention is able to realize scan conversion with high picture quality even when the input video signal includes both of telecine video signal and other video signal, or the input video signal has a new telecine pattern as the telecine pattern is interrupted amidst the telecine video signal, or there exist both of telecine video signal and video signal having a frame speed other than that of the telecine video signal.

The invention claimed is:

1. A scan conversion apparatus comprising:
a video signal discriminating circuit for discriminating kinds of input video signals based on an interlaced scanning system;
a telecine video scan conversion circuit for converting said input video signal into a video signal based on a progressive scanning system by processing suited for telecine video signal;
a scan conversion circuit for converting said input video signal into a video signal based on a progressive scanning system by processing suited for signals other than telecine video signal; and
a first selector which selects and delivers output from said telecine scan conversion circuit and output from said scan conversion circuit in accordance with result of discrimination executed by said video signal discriminating circuit, wherein said video signal discriminating circuit comprises:
a telecine detection circuit which outputs telecine pattern number and discrimination signal showing whether the input video signal is a telecine signal or not;
an interfield difference detection circuit which outputs Flag related to the level of coincidence between fields of said input video signal according to the telecine pattern number; and
a first AND circuit which obtains an output from said video signal discriminating circuit by calculating the logical product of the discrimination signal and the Flag,
wherein said telecine scan conversion circuit converts the input video signal into a video signal based on a progressive scanning system in accordance with the telecine pattern number.

2. The scan conversion apparatus of claim 1, wherein said interfield difference detection circuit comprises:
a pixel difference computation circuit for detecting difference in pixel value between specified adjacent fields in accordance with the telecine pattern number;
a first comparator which outputs result of comparison between the difference and first threshold value;
a cumulative addition circuit which accumulates output from the first comparator and outputs cumulative value; and
a second comparator which outputs the Flag in accordance with result of comparison between the cumulative value and second threshold value.

3. The scan conversion apparatus of claim 2, wherein the pixel value is the value of a pixel in same position counted in a vertical direction from vertical blanking and in same position counted in a horizontal direction from horizontal blanking.

4. The scan conversion apparatus of claim 2, wherein the pixel value is a value obtained through weighted operation between pixels respectively located in same horizontal position within a field.

5. The scan conversion apparatus of claim 2, wherein said cumulative addition circuit executes cumulative addition only within a specified region of a field.

6. The scan conversion apparatus of claim 2, wherein said interfield difference detection circuit further includes a threshold control circuit, and said threshold control circuit controls the second threshold value in accordance with the amount of a value from which the largest value within one period of the telecine pattern number is excluded in each field output from said cumulative addition circuit.

7. The scan conversion apparatus of claim 1, wherein said video signal discriminating circuit further includes a filter, and said filter serves to filter the input video signal, and the output from said filter is input to at least one of said telecine detection circuit and said interfield difference detection circuit.

8. The scan conversion apparatus of claim 1, wherein said scan conversion circuit generates a progressive scan video signal with use of said input video signal and highly correlated video signals in fields before and after the signal.

9. The scan conversion apparatus of claim 1, wherein said scan conversion circuit generates a progressive scan video signal with use of highly correlated video signals in said input video signal.

10. A scan conversion apparatus comprising:
a video signal discriminating circuit for discriminating kinds of input video signals based on an interlaced scanning system;
a telecine video scan conversion circuit for converting said input video signal into a video signal based on a progressive scanning system by processing suited for telecine video signal;
a scan conversion circuit for converting said input video signal into a video signal based on a progressive scanning system by processing suited for signals other than telecine video signal; and
a first selector which selects and delivers output from said telecine scan conversion circuit and output from said scan conversion circuit in accordance with result of discrimination executed by said video signal discriminating circuit, wherein said video signal discriminating circuit comprises:
a telecine detection circuit which outputs a discrimination signal showing whether the input video signal is a telecine signal or not;
a frame speed detection circuit for detecting frame speed of the input video signal to detect whether the detected speed is equal to the frame speed of telecine video signal; and
an AND circuit which obtains the output from said video signal discriminating circuit by calculating the logical product of the discrimination signal and the output from said frame speed detection circuit.

11. The scan conversion apparatus of claim 10, wherein said frame speed detection circuit comprises:
a first weighted sum circuit group for doing the weighted sum between pixels vertically aligned in the field of the input video signal;
a second selector for selecting one of outputs from the first weight sum circuit group;
a field memory for delaying the input signal by one field;
a second weighted sum circuit group for doing the weighted sum between pixels vertically aligned in a field output from said field memory;
a third selector for selecting one of outputs from said second weighted sum circuit group;
a field detection circuit for detecting kind of the field of the input video signal to control said second selector and said third selector in accordance with the kind of the field;
a first difference calculator for calculating difference between output from said second selector and output from said third selector;
a frame memory for delaying the input video signal by one frame;
a second difference calculator for calculating difference between the input video signal and the output from said frame memory; and
a third AND circuit which outputs the frame speed by obtaining the logical product of output from said first difference calculator and output from said second difference calculator.

12. The scan conversion apparatus of claim 10, wherein said scan conversion circuit generates a progressive scan video signal with use of said input video signal and highly correlated video signals in fields before and after the signal.

13. The scan conversion apparatus of claim 10, wherein said scan conversion circuit generates a progressive scan video signal with use of highly correlated video signals in said input video signal.

* * * * *